(12) United States Patent
Bunel et al.

(10) Patent No.: US 9,382,814 B2
(45) Date of Patent: Jul. 5, 2016

(54) DEVICE FOR CONNECTING A THRUST REVERSER FRONT FRAME TO A FAN CASING AND NACELLE INCORPORATING SUCH A DEVICE

(71) Applicant: AIRCELLE, Gonfreville l'Orcher (FR)

(72) Inventors: Serge Bunel, Le Havre (FR); Vincent Peyron, Le Havre (FR); Hazem Kioua, Saint Jouin Bruneval (FR); Jerome Lescure, Rouen (FR)

(73) Assignee: AIRCELLE, Gonfreville l'Orcher ( * ) Notice: Subject to any disclaimer, the term of this patent is extended or adjusted under 35 U.S.C. 154(b) by 582 days.

(21) Appl. No.: 13/860,726

(22) Filed: Apr. 11, 2013

(65) Prior Publication Data

US 2013/0227962 A1 Sep. 5, 2013

Related U.S. Application Data

(63) Continuation of application No. PCT/FR2011/052184, filed on Sep. 22, 2011.

(30) Foreign Application Priority Data

Oct. 11, 2010 (FR) ...................................... 10 58212

(51) Int. Cl.
*F02K 1/80* (2006.01)
*B64D 29/06* (2006.01)
(Continued)

(52) U.S. Cl.
CPC ............. *F01D 25/28* (2013.01); *F01D 25/243* (2013.01); *F02K 1/56* (2013.01); *F02K 1/766* (2013.01); *F02K 1/80* (2013.01); *F16B 2/14* (2013.01); *F16L 23/036* (2013.01); *F16L 37/101* (2013.01); *F05B 2240/911* (2013.01);
(Continued)

(58) Field of Classification Search
CPC ....... F16L 23/00; F16L 23/024; F16L 23/032; F16L 23/12; F16L 23/162; F16L 37/091; F16L 37/10; F16L 37/101; F16L 37/113; F16L 37/12; B64D 29/06; F02C 6/04; F02K 1/80
USPC ................ 285/280, 365, 367, 407; 244/53 B; 127/15.1
See application file for complete search history.

(56) References Cited

U.S. PATENT DOCUMENTS

| 179,815 | A | * | 7/1876 | O'Neill | ................. | F16L 37/091 |
| | | | | | | 15/145 |
| 228,209 | A | * | 6/1880 | Meier | ................... | F16L 37/252 |
| | | | | | | 285/365 |

(Continued)

FOREIGN PATENT DOCUMENTS

| EP | 0333919 | 9/1989 |
| GB | 882186 | 5/1959 |

*Primary Examiner* — Phutthiwat Wongwian
*Assistant Examiner* — Rene Ford
(74) *Attorney, Agent, or Firm* — Burris Law, PLLC

(57) ABSTRACT

A device for connecting a thrust reverser front frame to a fan casing includes a crenulated flange secured to the front frame, an annular component to accept this flange secured to the fan casing, and a crenulated annulus of a shape that complements the flange and pivot-mounted on the annular component. The crenulated flange, the annular component and the crenulated annulus are designed in such a way that a rotation of the annulus with respect to the annular component has the effect of locking this flange against this annular component through the collaboration between the respective crenulations of the flange and of the annulus.

13 Claims, 5 Drawing Sheets

Figure 1:
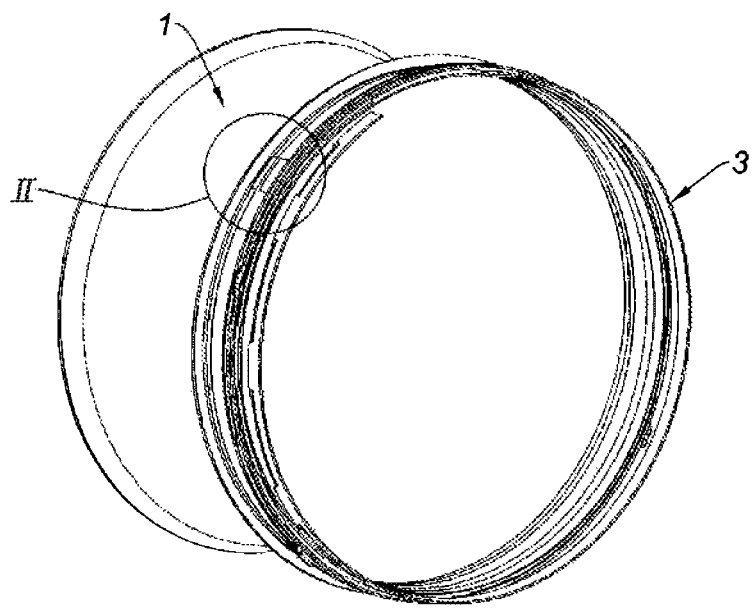

(51) Int. Cl.
*F16L 37/113* (2006.01)
*F01D 25/24* (2006.01)
*F01D 25/28* (2006.01)
*F02K 1/56* (2006.01)
*F02K 1/76* (2006.01)
*F16B 2/14* (2006.01)
*F16L 23/036* (2006.01)
*F16L 37/10* (2006.01)

(52) U.S. Cl.
CPC ...... *F05D 2230/60* (2013.01); *F05D 2250/411* (2013.01); *F05D 2260/30* (2013.01); *F05D 2260/50* (2013.01); *Y02T 50/671* (2013.01)

(56) References Cited

U.S. PATENT DOCUMENTS

| | | | | |
|---|---|---|---|---|
| 1,097,508 A * | 5/1914 | Bailey | ............ | F16L 37/091 285/362 |
| 1,965,915 A * | 7/1934 | Wilson | ............ | F16L 21/04 188/153 R |
| 2,417,025 A * | 3/1947 | Volpin | ............ | F16L 37/113 285/336 |
| 2,466,602 A | 4/1949 | Lombard | | |
| 2,716,563 A | 8/1955 | Seneschall | | |
| 2,788,498 A * | 4/1957 | Hardaway | ............ | H01P 1/042 285/359 |
| 2,809,057 A * | 10/1957 | McEachern | ............ | F02K 1/80 285/187 |
| 2,877,623 A | 3/1959 | Klompas | | |
| 4,199,175 A * | 4/1980 | Paukune | ............ | F01D 25/243 285/330 |
| 4,662,658 A * | 5/1987 | Holowach | ............ | F02K 1/386 285/148.26 |
| 4,838,584 A * | 6/1989 | Dierksmeier | ............ | B64D 29/00 285/419 |
| 4,951,973 A * | 8/1990 | Corsmeier | ............ | F01D 25/243 285/24 |
| 5,433,070 A * | 7/1995 | Amelio | ............ | F02C 7/04 137/15.1 |
| 8,210,809 B2 * | 7/2012 | Delobel | ............ | F01D 9/04 415/214.1 |
| 2012/0217372 A1 * | 8/2012 | Vauchel | ............ | B64D 29/06 248/554 |
| 2013/0298524 A1 * | 11/2013 | Le Boulicaut | ............ | B64D 29/08 60/226.2 |

* cited by examiner

DEVICE FOR CONNECTING A THRUST REVERSER FRONT FRAME TO A FAN CASING AND NACELLE INCORPORATING SUCH A DEVICE

CROSS-REFERENCE TO RELATED APPLICATIONS

This application is a continuation of International Application No. PCT/FR2011/052184 filed on Sep. 22, 2011, which claims the benefit of FR 10/58212, filed on Oct. 11, 2010. The disclosures of the above applications are incorporated herein by reference.

FIELD

The present disclosure relates to a device for connecting a thrust reverser front frame to a fan casing, and a nacelle incorporating such a device.

BACKGROUND

The statements in this section merely provide background information related to the present disclosure and may not constitute prior art.

As is known in itself, an aircraft propulsion assembly traditionally comprises a turbojet engine housed inside a nacelle.

This nacelle, which in particular makes it possible to fair the turbojet engine and channel the air coming from the outside toward it, typically comprises an upstream portion forming an air intake, an intermediate portion surrounding the fan casing of the turbojet engine, and a rear portion incorporating a thrust reverser as well as a jet nozzle for the cold air flow.

At its upstream end, the thrust reverser includes a substantially annular front frame, having a structural function.

The connection between the rear part and the middle part of the nacelle is traditionally done by a device for connecting the thrust reverser front frame to the fan casing.

In general, this connecting device consists of a substantially annular flange secured to the front frame, cooperating with a J- or V-shaped slot downstream of the fan casing.

Given the amplitude of the radial and axial forces at play at the interface between the front frame and the fan casing, it is necessary to provide that the slot formed on the fan casing is deep, which causes a relatively significant bulk and weight.

Furthermore, such a connecting device is not adapted to the particular case where the rear part of the nacelle is of the "O-duct" type, i.e., a single-piece annular type, as opposed to the case of a rear part of the "C-Duct" type, i.e., of the type comprising two halves that can be separated from each other for maintenance operations.

Such a connecting device must be placed by opening two or more areas of the rear part of the nacelle, which is not possible with an "O-duct" configuration, which is by definition a single piece and cannot be split.

SUMMARY

The present disclosure provides a device to connect a thrust reverser front frame to a fan casing.

The present disclosure thus provides a device for connecting a thrust reverser front frame to a fan casing that makes it possible to reduce the bulk and weight, and that is compatible with a rear nacelle part of the "O-duct" type.

This disclosure provides a device for connecting a thrust reverser front frame to a fan casing, which in one form comprises:
  a crenulated flange secured to said front frame,
  an annular component to accept this flange, secured to said fan casing, and
  a crenulated annulus of a shape that complements that of said flange, pivot-mounted on said annular component,
  wherein said crenulated flange, said annular component and said crenulated annulus are configured in such a way that the rotation of said annulus with respect to said annular component has the effect of blocking this flange against this annular component through the collaboration between the respective crenulations of said flange and of said annulus.

Owing to this particular arrangement, it is possible to react the radial and axial forces in both directions very efficiently, with notches having a bulk substantially smaller than the device of the prior art.

Due to its characteristics, the device according to the present disclosure, which operates like a quick-fitting pipe union, makes it possible to fix the crenulated flange of the thrust reverser front frame to the annular piece for accepting that flange, secured to the fan casing, by translating the thrust reverser, then rotating the crenulated annulus: aside from the fact that this connecting method is very simple and quick to implement (typically approximately 30 seconds), it can be used with a single-piece thrust reverser of the "O-duct" type.

Furthermore, in the event of a rupture of one or more of the teeth making up the notches of the flange or annulus, the adjacent teeth continue to maintain the cohesion of the connection, which offers a great degree of security.

Other optional features of the connecting device according to the present disclosure:
  said annular component has a radial abutment lip against the notches of said flange, covered by said crenulated annulus;
  said radial lip has an i-shaped section;
  said radial lip has an L-shaped section: this particular configuration makes it possible to reduce the radial bulk of the connection;
  said radial lip and the notches of said flange have mutual cooperation surfaces inclined relative to a transverse plane: this makes it possible to produce a conical-type connection between the flange of the thrust reverser and the annular component accepting that flange, and thus to axially and radially pre-stress the teeth forming the notches of the flange of the front frame; in this way, any relative axial or radial movement of the flange with respect to the annular component is prevented;
  the incline value of said surfaces is approximately 30°;
  the teeth of said notches have circumferential bevels: these bevels facilitate the mutual engagement of the teeth;
  said crenulated flange and said annular component have radial bevels: these bevels facilitate the engagement of the centering of said flange with said annular component;
  the notches of said flange and said annulus have a larger circumferential length at 12 o'clock than at six o'clock: this makes it possible to first engage the notches situated 12 o'clock, then the notches situated at six o'clock, which facilitates the connection of the flange on the circumferential component;
  said annular component includes a seal that can be comprised by said crenulated flange: this seal makes it possible to produce aerodynamic sealing:
  said crenulated annulus includes a slot, passed through by means for rotating said annulus;

said means comprise a pinion cooperating with a rack secured to said crenulated annulus;

said means comprise a control screw cooperating with a nut secured to said crenulated annulus.

The present disclosure also relates to a turbojet engine nacelle for an aircraft, remarkable in that it incorporates a connecting device as described above.

Further areas of applicability will become apparent from the description provided herein. It should be understood that the description and specific examples are intended for purposes of illustration only and are not intended to limit the scope of the present disclosure.

DRAWINGS

Figure 2:
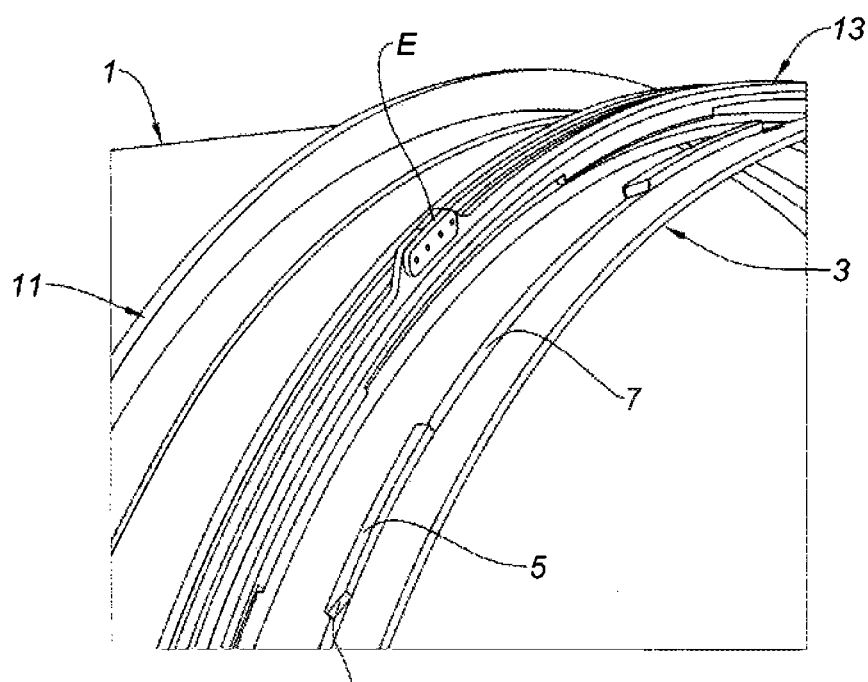
Figure 3:
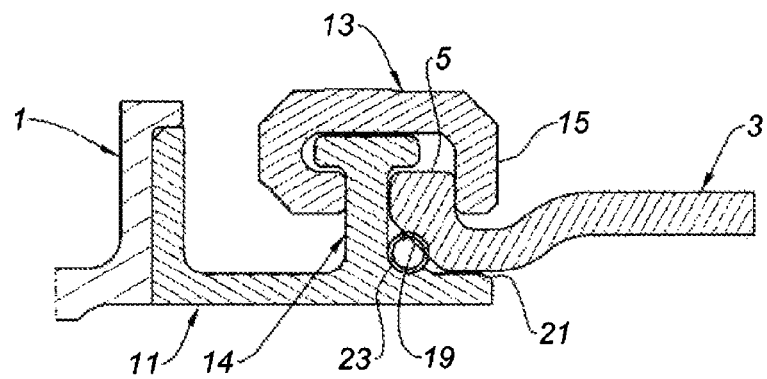
Figure 4:
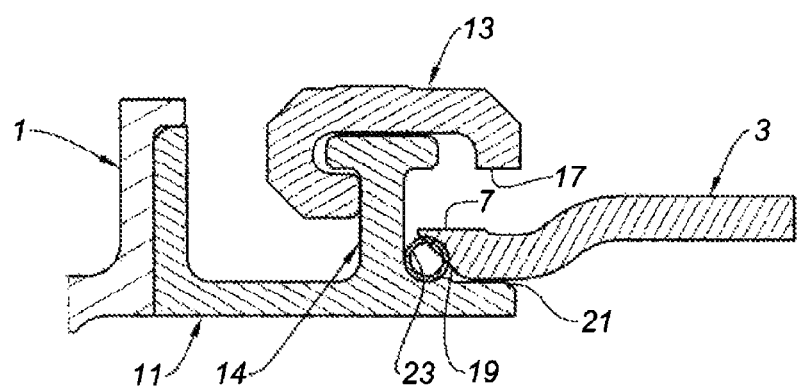
Figure 5:
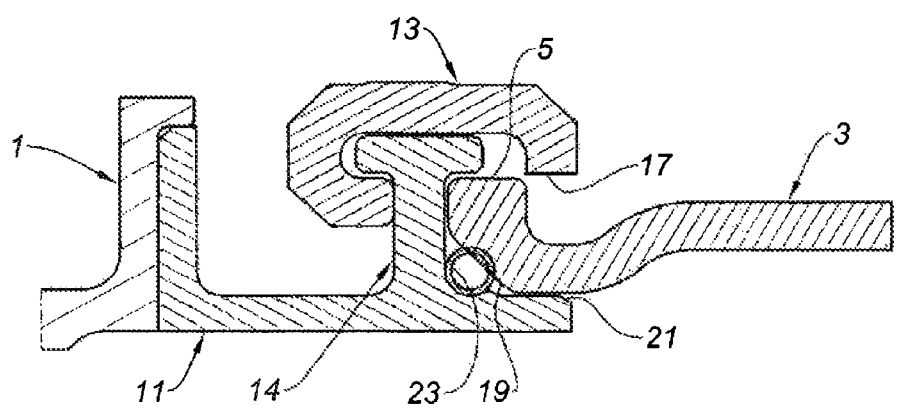
Figure 6:
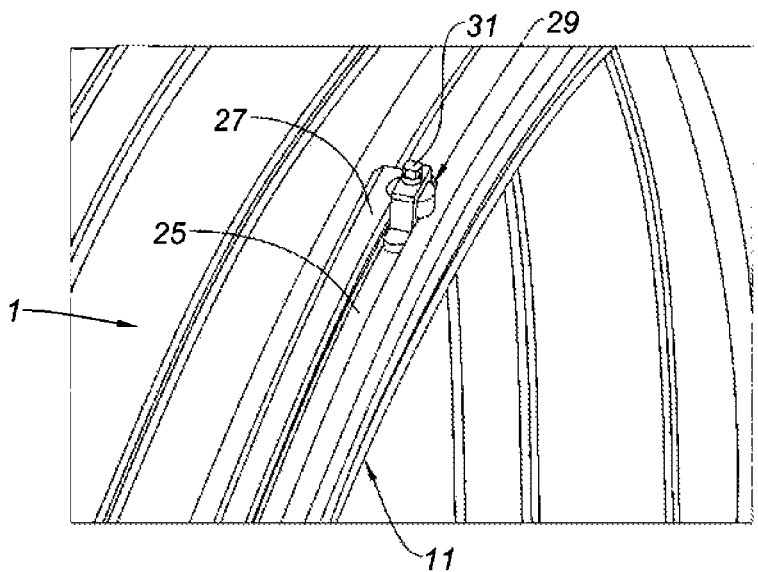
Figure 7:
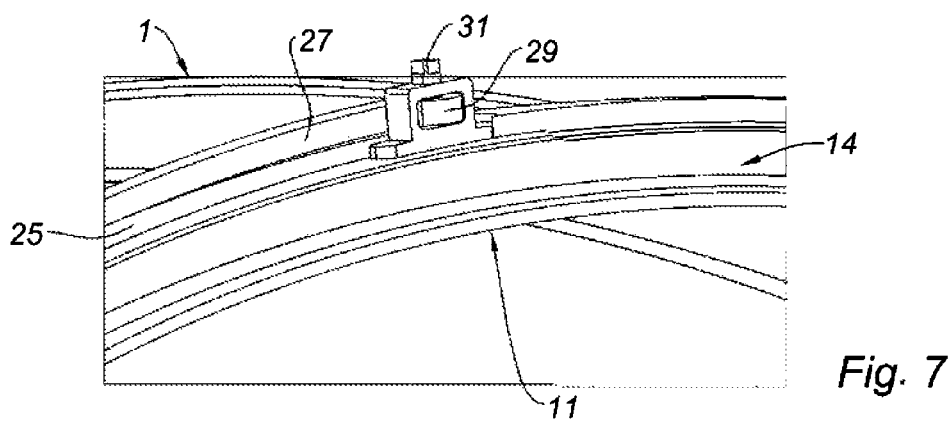
Figure 8:
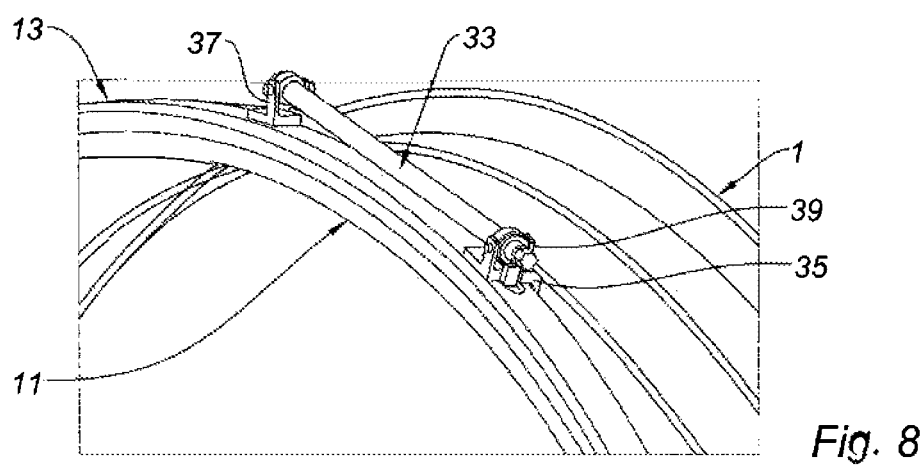
Figure 9A:
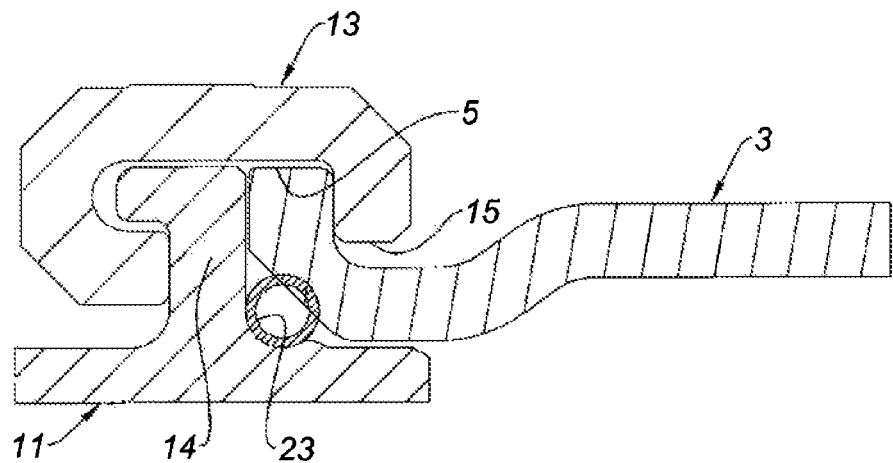
Figure 9B:
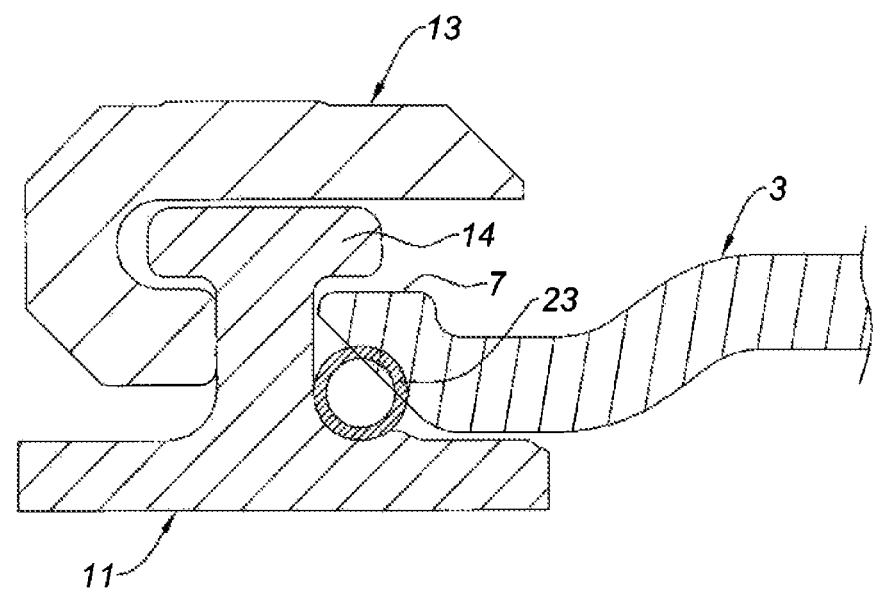
Figure 10:
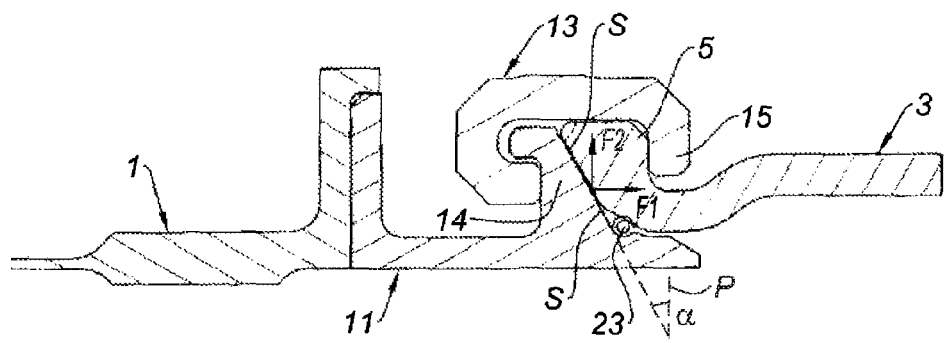
Figure 11:
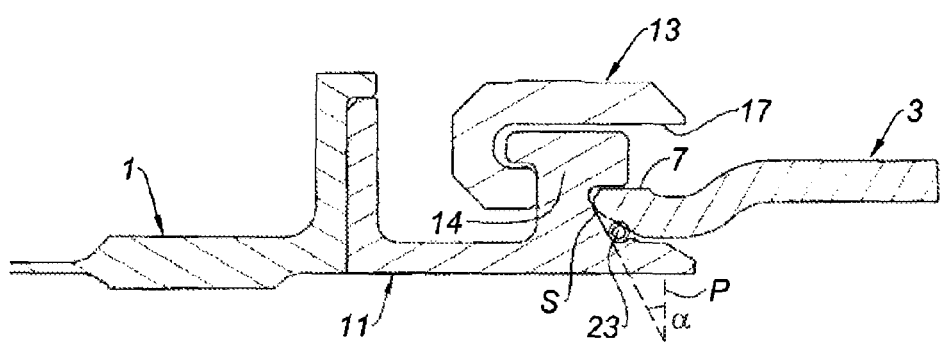

In order that the present disclosure may be well understood, there will now be described various forms thereof, given by way of example, reference being made to the accompanying drawings, in which:

Other features and advantages will appear in light of the following description, and the examination of the appended figures, in which:

FIG. 1 shows a perspective view of a turbojet engine fan casing, as well as a connecting device according to the present disclosure between the thrust reverser front frame and said casing, FIG. 2 is a detailed view of zone II of FIG. 1, FIG. 3 is an axial cross-sectional view of zone II, at a tooth of the crenulated flange, when the crenulated annulus is in the locked position;

FIG. 4 is a view similar to that of FIG. 3, taken at a gap of the crenulated flange, FIG. 5 is a view similar to that of FIG. 3, the crenulated annulus being in an unlocked position, FIG. 6 is a perspective view similar to that of FIG. 2, taken in a zone where means are located for rotating the crenulated annulus of the device according to the present disclosure, FIG. 7 is a detailed view of said rotating means, part of the crenulated annulus having been removed to facilitate comprehension, FIG. 8 is a perspective view similar to that of FIG. 6 of another form of the means for rotating the crenulated annulus, FIG. 9a is a view similar to that of FIG. 3 of another form of the crenulated flange and the annular component for receiving that flange of the device according to the present disclosure, FIG. 9b is a view similar to that of FIG. 9a, taken at a gap of the crenulated flange, and FIGS. 10 and 11 are views respectively similar to FIGS. 3 and 4 of another form of the crenulated flange, the annular component for receiving that flange, and the crenulated annulus of the device according to the present disclosure.

In all of these figures, identical or similar numbers designate identical or similar members or sets of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made to FIG. 1, which shows a fan casing 1, substantially assuming the form of an annular shroud.

As is known in itself, this casing is designed to surround a turbojet engine fan, so as to channel the outside flow of air toward the blades of that fan.

Downstream of said fan casing 1, i.e., at the straight line of FIG. 1, is a rear nacelle part (not shown), typically incorporating a thrust reverser device.

As indicated in the preamble of the present description, it is desirable to be able to fix the thrust reverser to the fan casing 1 very strongly.

This is done using a thrust reverser front frame (not shown), having a substantially annular shape.

According to the present disclosure, a crenulated flange 3 is rigidly fixed on said front frame.

As visible in particular in FIG. 2, said flange 3 includes a series of teeth 5 and hollows 7 defining notches, the teeth 5 preferably each being provided with a circumferential bevel 9.

An annular component 11 is rigidly fixed on the fan casing 1 so as to accept the crenulated flange 3.

A crenulated annulus 13 with a shape complementary to that of the crenulated flange 3 is pivotably mounted on the annular component 11, one or several joint bars E making it possible to assemble the different sections making up the annulus 13 on the annular component 11.

Reference will now be made to FIGS. 3 to 5, which show a more detailed view of how the crenulated flange 3, the annular component 11 and the crenulated annulus 13 cooperate.

As can be seen in these figures, the annular component 1 includes a lip 14 having an i-shaped section.

Similarly to the crenulated flange 3, the crenulated annulus 13 includes teeth 15 and hollows 17 defining notches complementary to those 5, 7 of the crenulated flange 3.

As shown in FIGS. 3 and 4, when the crenulated annulus 13 is in the locked position, the teeth 15 of the annulus 13 block the teeth 5 of the flange 3 against the i-shaped lip 14 of the annular component 11.

Due to the particular i shape of the lip 14, the teeth 5 are blocked against the i-shaped lip 14 using a corner-against-corner blocking, making it possible to eliminate any possibility of axial or radial movement of the crenulated flange 3 relative to the annular component 11.

Advantageously, one can note that radial bevels 19, 21 respectively made in the crenulated flange 3 and the annular component 11 facilitate the mutual axial engagement of those two parts, during connection operations of the thrust reverser to the fan casing 1.

It will also be noted that the seal 23, for example an O-ring, is advantageously inserted between the bevel 19 of the crenulated flange 3 and the i-shaped lip 14 of the annular component 11, so as to achieve aerodynamic sealing of the connection.

FIG. 5 shows the device of FIGS. 2 and 3 after pivoting of the crenulated annulus 13 so as to disconnect the thrust reverser from the fan casing 1.

As is visible in that figure, this pivoting of the crenulated annulus 13 relative to the annular component 11 results in bringing the hollows 17 of the annulus across from the teeth 5 of the crenulated flange 3, making it possible to disengage that flange, and therefore the entire thrust reverser assembly (not shown), from the annular component 11.

FIGS. 6 and 7 show one form of means making it possible to produce the pivoting of the crenulated annulus 13 relative to the annular component 11.

In this form, these means comprise a slot 25 formed in the crenulated annulus 13, as well as a circumferential rack 27 secured to the annulus 13 and housing the slot 25, as well as a pinion 29 rotatably mounted around a substantially radial axis, secured to the annular component 1.

This pinion 29 is topped by a cavity 31 making it possible to place an actuating key with a complementary shape.

To set the crenulated annulus 13 in rotation, one need only act on the cavity 31 using said key, which results in pivoting the pinion 29, and thus driving the rack 27, and lastly causing the crenulated annulus 13 to pivot circumferentially around the shared axis of the annular component 11 and the fan casing 1.

In another form shown in FIG. 8, a control screw is provided extending in a direction substantially tangent to the crenulated annulus 13, one end of which is fixed to a first U-bolt 35 passing through the slot 25 and securely fixed to the annular component 11, and whereof another end cooperates with a nut mounted on a second U-bolt 37 secured to the crenulated annulus 13.

The control screw 33 includes a cavity 39 allowing it to be actuated by a key of suitable shape.

To achieve the pivoting of the crenulated annulus 13 relative to the annular component 11, one need only rotate the control screw 33, which results in bringing the two U-bolts 35, 37 closer together or further apart, and thereby produces the desired pivoting.

This pivoting makes it possible to lock or unlock the crenulated flange 3 relative to the annular component 11.

In the alternative shown in FIG. 9a, the lip 14 of the annular component 11 has an L-shaped cross-section and not an i-shaped cross-section, as in the form described above, which makes it possible to have the radial length of that lip 14 not be greater than that of the teeth 5 of the crenulated flange 3, which makes it possible to save in terms of radial bulk of the connecting device according to the present disclosure.

As shown in FIG. 9b, in the hollow areas 7 of the crenulated flange 3, these hollows 7 abut against the lip 14 of the annular component 11, which makes it possible not to overload the notches of the annulus 13 by radial forces, those notches already being greatly biased by the reaction of the axial forces transmitted by the flange 3.

Advantageously, as shown in FIGS. 10 and 11, it is possible to provide that the mutual cooperation surface S of the teeth 5 with the lip 14 is inclined by an angle α typically of 30° relative to a transverse plane P.

This particular incline of the surface S makes it possible on the one hand to create an axial force F1 and on the other hand a radial force F2 on the teeth 5 of the crenulated flange 3, during locking of the crenulated annulus 13, those forces being able to produce pre-stresses avoiding any play between those components, and therefore any consecutive wear.

Preferably, this pre-stressing is done by reducing the circumferential length of the crenulated annulus 13, for example using a toggle lever bolt (i.e., with a lever effect) or a three-point bolt, arranged instead and in place of the joint bars E.

As will be understood in light of the preceding description, the connecting device according to the present disclosure has an extremely simple design, similar to a quick-fitting pipe union that can be used to connect fluid circulation ducts to each other.

This connecting device allows a connection and disconnection of the thrust reverser to the fan casing in a very short amount of time, which is very advantageous for maintenance operations.

Furthermore, this connecting device is particularly suitable for cases where the thrust reverser is of the "O-Duct" type, i.e., in the case where this thrust reverser is a single piece, and cannot easily be connected to the fan casing with devices having a J- or V-shaped slot of the prior art.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for connecting a thrust reverser front frame to a fan casing, said device comprising:
   a crenulated flange annular in shape and having radially outward extending teeth with notches in between the teeth, the crenlated flange secured to said thrust reverser front frame;
   an annular component to accept said crenulated flange, secured to said fan casing; and
   a crenulated annulus having radially inward extending teeth with notches between the teeth shaped to compliment the radially outward extending teeth of said crenulated flange, the crenulated annulus pivot-mounted on and slidable about said annular component,
   wherein said crenulated flange, said annular component, and said crenulated annulus are configured so that the crenulated flange slides axially into through the notches of the crenulated annulus and subsequent rotation of said crenulated annulus with respect to the relatively stationary annular component and crenulated flange has the effect of axially coupling said crenulated flange against said annular component through axial alignment of the teeth of said crenulated flange and the teeth of said crenulated annulus, and said annular component has a radial abutment lip against the notches of said crenulated flange, the radial abutment lip covered by said crenulated annulus.

2. The connecting device according to claim 1, wherein said radial abutment lip has an i-shaped section.

3. The connecting device according to claim 1, wherein said radial abutment lip has an L-shaped section.

4. The connecting device according to claim 3, wherein said radial abutment lip and the notches of said crenulated flange have mutual cooperation surfaces inclined relative to a transverse plane.

5. The connecting device according to claim 4, wherein an incline value of said mutual cooperation surfaces is approximately 30 degrees.

6. The connecting device according to claim 1, wherein teeth of said crenulated flange have circumferential bevels.

7. The connecting device according to claim 1, wherein said crenulated flange and said annular component have radial bevels.

8. The connecting device according to claim 1, wherein the notches of said crenulated flange and said crenulated annulus have a larger circumferential length at a 12 o'clock position than at a six o'clock position.

9. The connecting device according to claim 1, wherein said annular component includes a seal.

10. The connecting device according to claim 1, wherein said crenulated annulus includes a slot, passed through by means for rotating said crenulated annulus.

11. The connecting device according to claim 10, wherein said means comprise a pinion cooperating with a rack secured to said crenulated annulus.

12. The connecting device according to claim 10, wherein said means comprise a control screw cooperating with a nut secured to said crenulated annulus.

13. A turbojet engine nacelle for an aircraft including the connecting device according to claim 1.

* * * * *